G. H. ABEL, Jr.
BRACKET.
APPLICATION FILED MAR. 14, 1911.
1,011,302.
Patented Dec. 12, 1911.
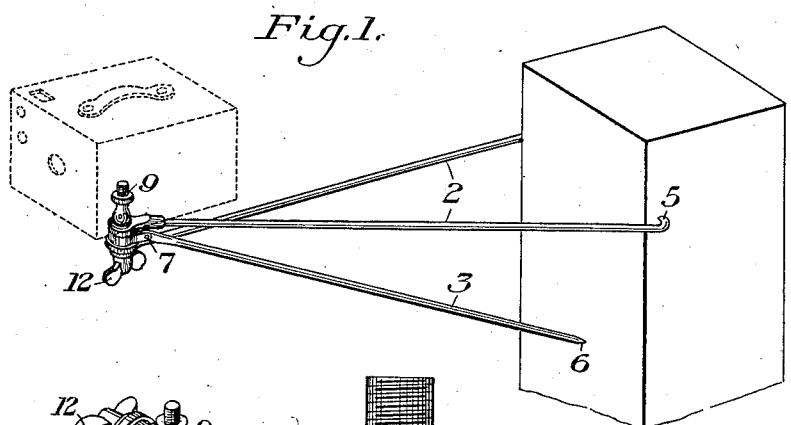
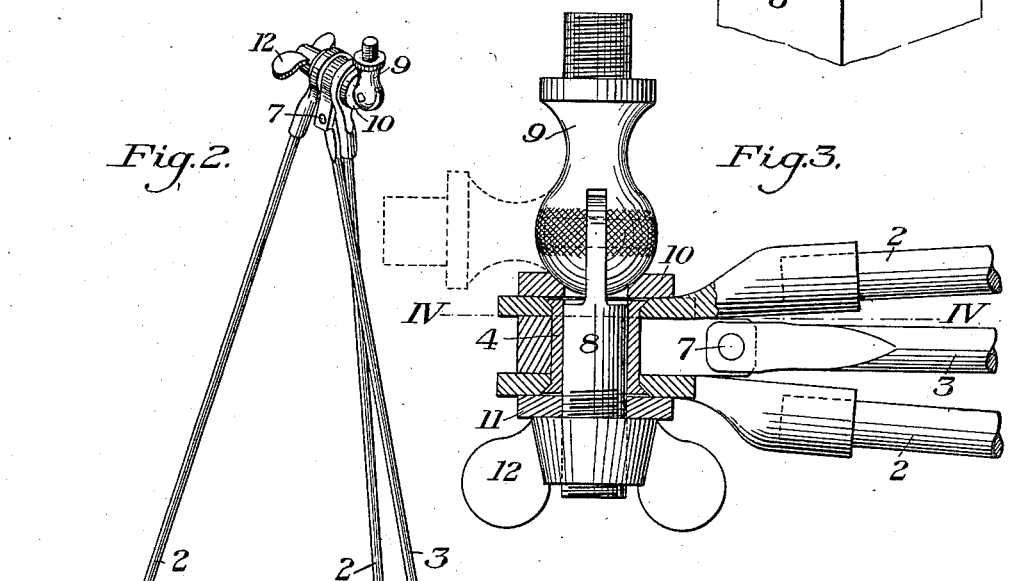
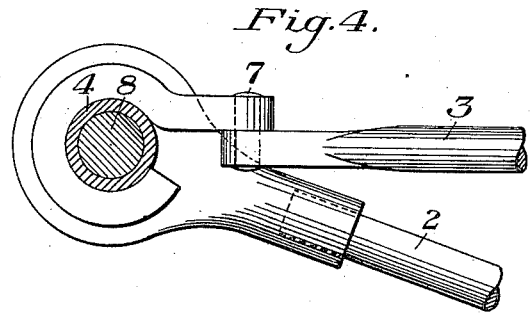
WITNESSES
R A Balderson
W Famaries
INVENTOR
Geo. H. Abel Jr.
by Bakewell, Byrnes & Parmelee,
his Attys.

UNITED STATES PATENT OFFICE.

GEORGE H. ABEL, JR., OF PITTSBURGH, PENNSYLVANIA, ASSIGNOR OF ONE-FOURTH TO THOMAS B. WYLIE, OF PITTSBURGH, PENNSYLVANIA.

BRACKET.

1,011,302.  Specification of Letters Patent.  Patented Dec. 12, 1911.

Application filed March 14, 1911. Serial No. 614,474.

*To all whom it may concern:*

Be it known that I, GEORGE H. ABEL, Jr., a resident of Pittsburgh, in the county of Allegheny and State of Pennsylvania, have invented a new and useful Improvement in Brackets, of which the following is a full, clear, and exact description, reference being had to the accompanying drawings, forming part of this specification, in which—

Figure 1 is a perspective view of one form of my bracket, showing the same connected to a post and arranged to support a camera; Fig. 2 is a similar view showing the device in a vertical position; Fig. 3 is a detail sectional view through the pivotal support for the legs; and Fig. 4 is a sectional view on the line IV—IV of Fig. 3.

My invention relates to adjustable brackets, and is designed to provide a cheap, simple and efficient bracket which can be adjusted to assume various positions as a supporting device.

The device is more particularly adapted to be used as a supporting bracket or tripod for a camera, and is arranged to be adjusted and then secured in its adjusted positions to give a proper support irrespective of the angle of the surface on which it is supported.

The precise nature of my invention will be best understood by reference to the accompanying drawings, which will now be described, it being promised, however, that various changes may be made in the details of construction and general arrangement of the parts without departing from the spirit and scope of my invention, as defined in the appended claims.

In the drawings, the numeral 2 designates two of the legs of the bracket or tripod, and 3 the other leg thereof. One end of each of the legs 2 is rotatably mounted on a sleeve 4. The openings through the ends of the legs 2 are countersunk, and the ends of the sleeve are upset to retain the legs on the sleeve. The other ends of the legs 2—2 are provided with hooks 5—5, and the other end of the leg 3 is pointed as indicated at 6. The leg 3 is provided with a pivotal connection as indicated at 7, so as to permit this leg to be swung at right angles to its pivotal connection on the sleeve 4.

8 is a bolt or screw passing through the bushing 4, and pivotally connected to one end of this bolt is a member 9 having a screw threaded portion at one end and a spherical head at its pivotal end.

10 is a washer surrounding the bolt 8 between one of the legs 2 and the spherical head of the member 9, and provided with a concaved recess arranged to permit the spherical head of the member 9 to be shifted to various positions, as hereinafter described. 11 is a washer surrounding the other end of the bolt 8 between a thumb nut 12 on the end of said bolt and the other leg 2, and is adapted to clamp the various members in their adjusted positions.

If the device is to be used as a supporting tripod or bracket for a camera, the camera is first attached to the screw threaded end of the member 9, and if it is desired to use the bracket in a vertical position, as shown in Fig. 2, the legs are first adjusted to their proper positions, and the member 9 is then adjusted so as to place the camera at the proper angle, the bolt 8 is then secured by means of the thumb nut 12 to clamp all of the members in their adjusted positions.

If it is desired to use the bracket in a horizontal position, as illustrated in Fig. 1, the hooked ends 5 of the legs 2 are driven into the support to which the tripod or bracket is to be connected, and the leg 3 is then placed to engage the desired point on the supporting post. The member 9 is then adjusted to place the camera in the proper position, and after the camera has been properly positioned, the various members are secured by means of the bolt 8 and the thumb nut 12.

The universal connection between the supporting member 9 and the bolt will permit the supporting member to be adjusted to the desired position, regardless of the position of the legs of the bracket.

The advantages of my invention result from the provision of a bracket or tripod which can be used in a vertical position or which can be rigidly connected to a vertical supporting member, and on which the camera or article supported on the supporting member can be adjusted in all directions. A further advantage results from the provision of means for rigidly securing all of the members in their adjusted positions.

I claim:

1. A supporting bracket having three legs, a pivotal connection at one end of said legs, a universally adjustable supporting member connected to the pivotal connection of the legs, and means for securing the three legs and the supporting member in their adjusted positions; substantially as described.

2. A supporting bracket having three legs, a sleeve on which the legs are rotatably mounted, a securing member passing through said sleeve, a supporting member mounted on one end of the securing member, a universal connection between the securing member and the supporting member, and means for securing all of the members in their adjusted positions; substantially as described.

3. A camera supporting bracket or tripod having three legs, a sleeve on which said legs are pivotally mounted, one of said legs having a pivotal connection between its ends and at right angles to the sleeve, a universally adjustable camera supporting member extending through the sleeve, and means for rigidly clamping said member and the legs in their adjusted positions; substantially as described.

4. A camera supporting bracket or tripod having three legs, a sleeve on which said legs are pivotally mounted, the ends of two of the legs having hook members arranged to be driven into a suitable support, the end of the other leg being pointed, a pivotal connection between the ends of the last mentioned leg at right angles to the sleeve, and a securing bolt passing through the sleeve arranged to secure the members in their adjusted positions; substantially as described.

In testimony whereof, I have hereunto set my hand.

GEO. H. ABEL, JR.

Witnesses:
JESSE B. HELLER,
H. M. CORWIN.

Copies of this patent may be obtained for five cents each, by addressing the "Commissioner of Patents, Washington, D. C."